United States Patent Office 3,313,744
Patented Apr. 11, 1967

3,313,744
1,4 - BIS(3-DIMETHYLAMINOPROPYL)PIPERAZINE CATALYST FOR POLYURETHANE PREPARATION
Doris M. Rice, Austin, Tex., assignor to Jefferson Chemical Company, Inc., Houston, Tex., a corporation of Delaware
No Drawing. Filed Dec. 3, 1962, Ser. No. 241,476
4 Claims. (Cl. 260—2.5)

This invention relates to a new tertiary amine. More particularly, this invention relates to a new tertiary amine and to a catalytic method for the synthesis of polyurethanes employing the new tertiary amine. Still more particularly, this invention relates to a new method for the preparation of foamed polyurethanes.

It is known to prepare foamed polyurethanes by the reaction of a polyisocyanate, a polyol and a blowing agent, such as a halogenated hydrocarbon, water, or both, in the presence of a catalyst. The catalyst is employed to promote at least two and sometimes three major reactions that must proceed simultaneously and competitively at balanced rates during the process in order to provide a good polyurethane foam. One reaction is a chain-extending isocyanate-hydroxyl reaction by which a hydroxyl-containing molecule is reacted with an isocyanate-containing molecule to form a urethane. This increases the viscosity of the mixture and provides a polyurethane containing secondary nitrogen atoms in the urethane groups. A second reaction is a cross-linking isocyanate-urethane reaction by which an isocyanate-containing molecule reacts with a urethane group containing a secondary nitrogen atom. The third reaction is an isocyanate-water reaction, by which an isocyanate-terminated molecule is extended and by which carbon dioxide is generated to blow or assist in blowing the foam. The third reaction is not essential if an extraneous blowing agent, such as a halogenated normally liquid hydrocarbon, carbon dioxide, etc., is employed, but is essential if all, or even a part, of the gas for foam generation is to be generated by this in situ reaction (e.g., in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If chain extension is too rapid in comparison with carbon dioxide evolution, foam rise will be restricted, resulting in a high-density foam with a high percentage of poorly defined cells. The foam will not be stable in the absence of adequate cross-linking.

It has long been known that tertiary amines, such as trimethylamine, triethylamine, etc., are effective for catalyzing the second cross-linking reaction. Some of the tertiary amines are effective for catalyzing the third water-isocyanate reaction for carbon dioxide evolution. However, tertiary amines are only partially effective as catalysts for the first chain-extension reaction. To overcome this problem, the so-called "pre-polymer" technique has been developed wherein a hydroxy-containing polyol component is partially reacted with the isocyanate component in order to obtain a liquid pre-polymer containing free isocyanate groups. This pre-polymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein triethylenediamine is employed in conjunction with an organic tin compound. Triethylenediamine is particularly active for promoting the water-isocyanate reaction, and the tin compound is particularly active in synergistic combination with the triethylenediamine for promoting the chain-extension reaction.

However, even here, the results obtained leave much to be desired. Thus, triethylenediamine tends to impart a strong amine odor to the polyurethane foam and is normally used in conjunction with another less active tertiary amine such as N-ethylmorpholine in order to obtain a still better balance between carbon dioxide evolution reactions and chain-extension reaction.

In accordance with the present invention, a new compound has been discovered; namely, 1,4-bis(3-dimethylaminopropyl)piperazine having the following structural formula:

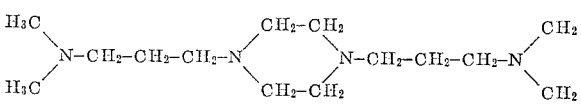

The new amine can be prepared easily by the methylation of 1,4-bis(3-aminopropyl)piperazine with formic acid and paraformaldehyde.

It has been further discovered in accordance with the present invention that 1,4-bis(3-dimethylaminopropyl)-piperazine is a surprisingly effective catalyst for use in the preparation of urethanes in that it has two unexpected and beneficial properties. First, it is hyperactive with respect to promotion of the isocyanate-water reaction and, secondly, it is, for all practical effect, ineffective for catalyzing the chain-extension reaction either alone or in admixture with tin compounds. As a consequence, it is effective as a catalyst for both the pre-polymer and "one-shot" systems. Surprising and highly beneficial results are obtained with this catalyst in preparing flexible foams by the "one-shot" method.

The isocyanate to be used in accordance with the present invention should be an organic arylene polyisocyanate. Representative polyisocyanates include 3,3'-dichloro-4,4'-biphenylene diisocyanate, diphenyl diisocyanate, diphenyl triisocyanate, triphenyl diisocyanate, p-phenylene diisocyanate, toluene diisocyanate (such as a mixture of the 2,4- and 2,6-isomers), diphenyl methane-p,p'-diisocyanate, etc., or mixtures thereof.

The hydroxyl-containing polyol component may suitably be a hydroxyl-containing polyester or polyol having a hydroxyl number ranging from about 700 to about 40, or lower. When it is desired to provide a flexible foam, the hydroxyl number is preferably in the range from about 40 to 60. For rigid foams, the hydroxyl number is preferably in the range from about 350 to 700. Semi-rigid foams of a desired flexibility are provided when the hydroxyl number is intermediate to the ranges just given.

When the polyol is a polyester, it is preferable to use, as the polyester, a resin having a relatively high hydroxyl value and a relatively low acid value. The acid component of the polyester is preferably of the dibasic or polybasic type and is usually free of reactive unsaturation, such as ethylenic groups or acetylenic groups. The unsaturation, such as occurs in the rings of such aromatic acids, a phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc., may be employed. The alcohol component for the polyester should preferably contain a plurality of hydroxyl groups and is preferably an aliphatic alcohol, such as ethylene glycol, propylene glycol, dipropylene glycol, diethylene glycol, glycerol, pentaerythritol, trimethylolethane, trime thylolpropane, mannitol, sorbitol, polyglucosides, etc. Mixtures of two or more of the above-identified alcohols may be employed also if desired.

When a flexible urethane foam is desired, the polyol should preferably have an average functionality of about three (e.g., 2.5 to 3.5). For rigid foams, the functionality of the polyol component is preferably four or more (e.g., five to seven).

When the hydroxyl-containing component is a polyol, the polyol may be an alkylene oxide condensate of a polyhydric alcohol of the type described above. The alkylene oxide may suitably be ethylene oxide, propylene oxide, or 1,2-butylene oxide or 1,4-butylene oxide. The polyol will suitably have a molecular weight with in the range of from about 500 to about 5,000. For flexible polyurethane foams, the alkylene oxide is preferably propylene oxide and the molecular weight is preferably within the range of about 2,000 to 4,000, and for rigid polyurethane foams the alkylene oxide is preferably propylene oxide and the molecular weight of the polyol is preferably within the range of from about 500 to about 1,000.

The amount of hydroxyl-containing polyol compound to be used relative to the isocyanate compound normally should be such that the isocyanato groups are present in at least an equivalent amount, and preferably, in slight excess, compared with the free hydroxyl groups. Preferably, the ingredients will be proportioned so as to provide from about 1.05 to about 1.5 mol equivalents of isocyanato groups per mol equivalent of hydroxyl groups.

When water is used, the amount of water, based on the hydroxyl compound, is suitably within the range of about 0.05 to about 0.25 mol per mol equivalent of hydroxy compound.

It is within the scope of the present invention to utilize an extraneously added inert blowing agent such as a gas or gas-producing material. For example, halogenated low-boiling hydrocarbons, such as dichlorodifluoromethane, methylene chloride, carbon dioxide, nitrogen, natural gas, etc., may be used. The inert blowing agent reduces the amount of excess isocyanate and water that is required in preparing flexible urethane foam. For a rigid foam, it is preferable to avoid the use of water and to use exclusively the extraneous blowing agent.

The catalyst composition to be used in the preparation of polyurethane foams in accordance with the present invention, based on the combined weight of the hydroxyl-containing compound and polyisocyanate, is from about 0.02 to about 0.2 weight percent of a tertiary amine comprising 1,4-bis(3-dimethylaminopropyl)piperazine and, for flexible urethane foams, from about 0.1 to about 0.4 weight percent of an organic tin compound.

The organic tin compound may suitably be a stannous or stannic compound, such as a stannous salt of a carboxylic acid, a trialkyltinoxide, a dialkyltindihalide, a dialkyltinoxide, etc., wherein the organic groups of the organic portion of the tin compound are hydrocarbon groups containing from one to eight carbon atoms. For example, dibutyltindilaurate, dibutyltindiacetate, diethyltindiacetate, dihexyltindiacetate, di-2-ethylhexyltinoxide, dioctyltindioxide, stannous octoate, stannous oleate, etc., or a mixture thereof, may be used.

The tertiary amine components should contain at least 20 weight percent of 1,4-bis(3-dimethylaminopropyl)-piperazine an dwill preferably consist entirely of 1,4-bis-(3-dimethylaminopropyl)piperazine. Good results are also obtained using a mixture of from about 20 to about 50 weight percent of 1,4-bis(3-dimethylaminopropyl)piperazine with, correspondingly, from about 80 to about 50 weight percent of one or more other tertiary amines, such as trialkylamines (e.g., trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., aliphatic polyamines, such as N,N,N',N'-tetramethyl-1,3-butanediamine, pentamethyldiethylenetriamine, tetramethylethylenediamine, etc.

Conventional formulation ingredients are also employed, such as, for example, a foam stabilizer. The foam stabilizer may be an organic silane or siloxane. For example, compounds may be used having the formula:

$$R'Si[O—(R_2SiO)_n—(oxyalkylene)_mR]_3$$

wherein R is an alkyl group containing from one to four carbon atoms; $n$ is an integer of four to eight; $m$ is an integer of 20 to 40; and the oxyalkylene groups are derived from propylene oxide and ethylene oxide.

In preparing a flexible foam, the ingredients may be simultaneously, intimately mixed with each other by the so-called "one-shot" method to provide the foam by a one-step process. In this instance, water should comprise at least a part (e.g., 10% to 100%) of the blowing agent. The foregoing methods are known to those skilled in the art, as evidenced by the following publication: Du Pont Foam Bulletin, "Evaluation of Some Polyols in One-Shot Resilient Foams," March 22, 1960.

When it is desired to prepare rigid foams, the method that is preferably employed is the so-called "quasi-prepolymer method," wherein the hydroxyl-containing component preferably contains from about four to seven reactive hydroxyl groups, on the average, per molecule.

In accordance with this method, a portion of the hydroxyl-containing component is reacted in the absence of a catalyst with the polyisocyanate component in proportions so as to provide from about 20% to about 40% of free isocyanato groups in the reaction product, based on the polyol. To prepare a foam, the remaining portion of the polyol is added and the two components are allowed to react in the presence of a catalytic amount of 1,4-bis-(3-dimethylaminopropyl)piperazine and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the pre-polymer or remaining polyol, or both, prior to the mixing of the component, whereby at the end of the reaction a rigid polyurethane foam is provided.

Urethane elastomers and coatings may be prepared also by known techniques in accordance with the present invention wherein 1,4-bis(3-dimethylaminopropyl)piperazine is used as a catalyst. See, for example, Du Pont Bulletin PB–2, by Remington and Lorenz, entitled, "The Chemistry of Urethane Coatings."

The invention will be illustrated further with respect to the following specific examples, which are given by way of illustration and not as limitations on the scope of this invention.

PREPARATION OF 1,4-BIS(3-DIMETHYLAMINOPROPYL)-PIPERAZINE

*Example I*

The primary amine, 1,4-bis(3-aminopropyl)piperazine (0.5 mol.) was added drop-wise with agitation to a mixture of paraformaldehyde (2.2 mols) with formic acid (2.2 mols) at 65–85° C. Toward the end of the reaction, 100 milliliters of water was added to depress foaming. When all the amine had been added, the mixture was refluxed at 100–108° C. for two hours to complete the reaction. The product was made strongly basic with sodium hydroxide and saturated with sodium chloride. The crude amine layer was extracted with diethyl ether to remove polymeric materials formed during the reaction. The ether was evaporated and the crude product distilled through a heated column under vacuum. The fraction boiling at 123–124° C. at 0.25 millimeter of mercury was collected as a methylated amine. A yield of 30 grams, representing 23.4% of theoretical was obtained.

The identification of the product as 1,4-bis(3-dimethylaminopropyl)piperazine was confirmed by analysis. For example, no primary or secondary amine groups could be detected by infrared or near infrared analysis.

Example II

Formic acid (24 mols) was weighed into a 4-liter flask, and 1,4-bis(3-aminopropyl)piperazine (three mols) was added slowly with cooling in an ice bath. Paraformaldehyde (13.2 mols) was then added slowly stepwise to the mixture while maintaining the temperature between 65° and 75° C. After carbon dioxide evolution subsided, the reaction mixture was heated to 95–100° C. for 20 hours to carry the reaction to completion. The solution was then neutralized with 1,150 grams of sodium hydroxide. As much of the crude product as possible was decanted off and the rest was extracted with diethylether. The extractions were evaporated, and the combined fractions were vacuum distilled through a heated column packed with stainless steel protruded packing. The fraction boiling at 125–127° C. at 0.2 to 0.25 millimeter of mercury was collected as the methylated product. A yield of 527 grams was obtained, representing 68.7% of theoretical.

CATALYTIC ACTIVITY OF 1,4-BIS(3-DIMETHYL-AMINOPROPYL)PIPERAZINE

Example III

A solution was prepared from 1/300 mol (0.845 gram) of 1,4-bis(3-dimethylaminopropyl)piperazine, 5.0 grams of water and tetrahydrofuran to make 100 milliliters of solution. A ten-milliliter portion of the solution was placed in a stirred thermostatted reaction flask attached to a gas measuring device. After the flask and reagents had come to thermal equilibrium at 30° C., five milliliters of tolylene diisocyanate was injected into the flask through a rubber membrane, and the volume of carbon dioxide evolved was measured at 15-second intervals. The maximum rate of carbon dioxide evolution was 110 milliliters at 15 seconds, attained during the first 30 seconds. The following figures are given for comparison with similar runs made with other tertiary amines:

TABLE I

| Catalyst: | Maximum rate ml./15 sec. |
|---|---|
| 1,4-bis(3-dimethylaminopropyl)piperazine | 110 |
| Triethylenediamine | 79 |
| Dimethylpiperazine | 44 |
| N-ethylmorpholine | 23 |
| N,N,N',N'-tetramethyl-1,3-butanediamine | 51 |

As can be seen from the foregoing table, 1,4-bis-(3-dimethylaminopropyl)piperazine is superior on a molar basis to the other tertiary amines, including triethylenediamine, for catalyzing the isocyanate-water reaction (which gives rise to carbon dioxide for foam formation).

Example IV

A commercial polyether prepared by the reaction of propylene oxide with glycerin and having an average molecular weight of about 3,000 (250 grams) and 1,4-bis(3-dimethylaminopropyl)piperazine (0.50 gram) were weighed into a 500-milliliter three-necked flask. The flask was equipped with a stirrer and thermocouple and placed in a constant temperature bath at 30° C. Toluene diisocyanate (35.6 milliliters) was also placed in the bath. When the reagents had come to thermal equilibrium, the flask was removed from the bath and insulated with a foam cover. The toluene diisocyanate was added and the temperature was taken at 15-second intervals for 2.5 minutes to determine the chain-extension activity of the amine.

The activity of 1,4-bis(3-dimethylaminopropyl)piperazine was found to be 0.060° F. per second. The chain-extension activity of several other amines was determined in the same manner. In order to determine the synergistic effect that is obtained when a tertiary amine is utilized in conjunction with a tin compound, the measurements were repeated using 0.25 gram of stannous octoate in addition to the tertiary amine. The results are listed below:

TABLE II

| Catalyst: | Activity, ° F./Sec. |
|---|---|
| 0.2% 1,4-bis(3-dimethylaminopropyl)piperazine | 0.06 |
| 0.2% triethylenediamine | 0.40 |
| 0.2% N,N,N',N'-tetramethyl-1,3-butanediamine | 0.08 |
| 0.1% stannous octoate | 1.28 |
| 0.1% stannous octoate+0.2% 1,4-bis(3-dimethylaminopropyl)piperazine | 1.28 |
| 0.1% stannous octoate+0.2% triethylenediamine | 1.66 |
| 0.1% stannous octoate+0.2% N,N,N',N'-tetramethyl-1,3-butanediamine | 1.49 |

As can be seen from the foregoing table, 1,4-bis(3-dimethylaminopropyl)piperazine was not effective in catalyzing the chain-extension reaction, either alone or in admixture with stannous octoate.

PREPARATION OF FLEXIBLE POLYURETHANE FOAM

Example V

Hand-mixed one-shot flexible polyurethane foams were prepared from toluene diisocyanate and a polyol having an average molecular weight of about 3,000 prepared by the propoxylation of glycerin. In the series of experiments that were performed, the tertiary amine catalysts that were used were N-ethylmorpholine, triethylenediamine and 1,4-bis(3-dimethylaminopropyl)piperazine. Various combinations of these three tertiary amines with an organotin compound (stannous octoate) were tried. The formulations prepared, the reaction conditions employed and the properties of the final polyurethane foam are given in the following table:

TABLE III

| Formulation (parts by weight) | A | B | C | D | E | F |
|---|---|---|---|---|---|---|
| Triol | 400 | 400 | 400 | 400 | 400 | 400 |
| Water | 13.2 | 13.2 | 13.2 | 13.2 | 13.2 | 13.2 |
| Silicone oil | 4.0 | 4.0 | 4.0 | 4.0 | 4.0 | 4.0 |
| Toluenediisocyanate | 164 | 164 | 164 | 164 | 171 | 171 |
| Stannous octoate | 1.4 | 1.4 | 1.4 | 1.0 | 1.2 | 1.2 |
| N-ethylmorpholine | 1.2 | 1.2 | 1.2 | 0 | 1.2 | 0 |
| Triethylenediamine | 0.4 | 0 | 0 | 0.4 | 0 | 0 |
| 1,4-bis(3-dimethylaminopropyl)piperazine | 0 | 0.4 | 0.4 | 0.4 | 0.4 | 0.8 |
| Reaction Conditions: | | | | | | |
| Cream time, sec | 13 | 13 | 13 | 10 | 12 | 12 |
| Rise time, sec | 84 | 95 | 100 | 95 | 105 | 103 |
| Tack-free time, min | 14–15 | 16 | 14 | | 25 | 25 |
| Properties: | | | | | | |
| Density, lbs./ft | 1.82 | 1.81 | | | 1.80 | 1.81 |
| Tear strength, lb./in | 2.47 | 2.35 | | | 1.86 | 1.98 |
| Tensile strength, lb./in | 14.5 | 17.8 | | | 16.1 | 12.6 |
| Percent ultimate elongation | 208 | 460 | | | 235 | 259 |
| RMA (4″): | | | | | | |
| 25% | 27.1 | 25.0 | 27.0 | 27.0 | 26.1 | 29.3 |
| 50% | 36.0 | 33.2 | 34.7 | 34.2 | 35.0 | 39.4 |
| 65% | 46.9 | 44.4 | 45.1 | 45.8 | 45.0 | 51.1 |
| 75% | 70.0 | 67.5 | 64.2 | 68.6 | 66.9 | 76.8 |

Formulation A in the series of formulations set forth in Table III represents a typical foam formulation of the type employed conventionally to prepare flexible polyurethane foam. In the conventional formulation, stannous octoate, N-ethylmorpholine and triethylenediamine are employed as a catalyst mixture.

Formulation B, in accordance with the present invention, substituted 1,4 - bis(3 - dimethylaminopropyl) piperazine for triethylenediamine. It will be observed that the polyurethane foam prepared from formulation B was superior to the foam of formulation A with respect to percent ultimate elongation and was otherwise fully equivalent to the foam prepared from the commercial formulation. Formulation E shows that equivalent results are obtained even with a higher isocyanate content, while formulation F shows that good results are obtained even when 1,4 - bis(3 - dimethylaminopropyl) piperazine is employed as the sole tertiary amine component of the formulation.

PREPARATION OF RIGID POLYURETHANE FOAMS

Example VI

Hand-mixed quasi-pre-polymer rigid foams were prepared using 1,4-bis(3-dimethylaminopropyl)piperazine as a catalyst. The formulations prepared employed, as the polyol component, a propylene oxide adduct of sorbitol having an average molecular weight of 700. The quasi-pre-polymer was prepared from the just-mentioned hexol and commercial toluene diisocyanate and contained 28.5% free —N=C=O. The formulations prepared and the properties of the foams obtained through the use of the formulations are set forth in the following table:

TABLE IV

| Formulation (parts by weight) | A | B |
|---|---|---|
| Quasi-pre-polymer | 200 | 200 |
| Sorbitol-propylene oxide adduct of 700 molecular weight | 147 | 147 |
| Silicone oil | 2.0 | 3.0 |
| 1,4-bis(3-dimethylaminopropyl)piperazine | 2.0 | 4.0 |
| Freon-11 | 55 | 55 |
| Results: | | |
| Cream time, sec | 75 | 45 |
| Rise time, min | 8 | 4½ |
| Cell structure | (1) | (2) |
| Density, lbs./ft³ | 2.14 | 2.09 |
| Compression, 10%, lb./in² | 36.6 | 42.9 |

¹ Large uniform.
² Small uniform.

As will be seen from the foregoing table, the formulations of the present invention provided satisfactory cream times and rise times and resulted in the formulation of rigid polyurethane foam having good physical properties.

Having thus described my invention, what is claimed is:

1. A method of producing a urethane which comprises reacting an organic polyisocyanate with an organic hydroxy compound in the presence of a catalytic quantity of 1,4-bis(3-dimethylaminopropyl)piperazine, said organic hydroxy compound being selected from the group consisting of polyhydric alcohols and linear polyesters having terminal hydroxyl groups, which polyesters are obtained from the reaction of a polycarboxylic acid with a polyhydric alcohol.

2. A method for producing a polyurethane foam which comprises reacting toluene diisocyanate with a long chain hydroxyl-terminated condensation product of glycerol with propylene oxide in the presence of a catalytic mixture containing from about 0.2 to about 0.8 weight percent of 1,4-bis(3-dimethylaminopropyl)piperazine and from about 0.01 to about 0.3 weight percent of stannous octoate based on the combined weight of the toluene diisocyanate and condensation product of glycerol with propylene oxide, said toluene diisocyanate being employed in an amount sufficient to provide 1.05 to 1.5 mol equivalents of isocyanato groups per mol equivalent of hydroxyl groups, from about 0.05 to about 0.25 mol of water being employed per mol equivalent of hydroxyl groups in the condensation product of glycerol with propylene oxide, said condensation product having a molecular weight within the range of about 2,000 to about 4,000.

3. A method for preparing a rigid polyurethane foam which comprises the steps of preparing a pre-polymer reaction product of an arylene diisocyanate with a hydroxy-terminated polyether with mol proportions so as to provide from about 20% to about 40% of free isocyanato groups, separately preparing a mixture of a polyether with a halo-genated normally liquid hydrocarbon and 1,4-bis(3-dimethylaminopropyl)piperazine and mixing said pre-polymer with said mixture to thereby initiate a foam-generating reaction whereby to rigid polyurethane foam is formed, said polyether having been prepared by the reaction of a polyhydric alcohol containing an average of from about five to about seven hydroxyl groups per molecule with an amount of propylene oxide sufficient to provide a polyether having a hydroxyl number in the range from about 350 to about 500.

4. A method as in claim 3 wherein the arylene diisocyanate is toluene diisocyanate and wherein the polyether is a propylene oxide condensate of sorbitol.

References Cited by the Examiner

UNITED STATES PATENTS

| | | | |
|---|---|---|---|
| 2,762,744 | 9/1956 | Hazzard et al. | 260—268 |
| 2,949,431 | 8/1960 | Britain | 260—2.5 |
| 3,044,971 | 7/1962 | Polis | 260—2.5 |
| 3,075,927 | 1/1963 | Lanham | 260—2.5 |
| 3,084,177 | 4/1963 | Hostettler et al. | 260—2.5 |

FOREIGN PATENTS 1,109,882   6/1961   Germany.

OTHER REFERENCES

Keyworth: "Chemical Abstracts," vol. 54, page 24776e.

LEON J. BERCOVITZ, *Primary Examiner.*

DONALD E. CZAJA, J. KLOCKO, *Assistant Examiners.*